(12) United States Patent
Milirud et al.

(10) Patent No.: US 8,887,077 B2
(45) Date of Patent: Nov. 11, 2014

(54) SYNCHRONIZED GRAPHICAL AND TABULAR PERFORMANCE DATA DISPLAY

(75) Inventors: Michael Milirud, Sammamish, WA (US); Robin Giese, Mercer Island, WA (US); Nathan Teeuwen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 13/301,460

(22) Filed: Nov. 21, 2011

(65) Prior Publication Data

US 2013/0132872 A1    May 23, 2013

(51) Int. Cl.
    *G06F 3/048*    (2013.01)
    *H04L 12/26*    (2006.01)

(52) U.S. Cl.
    CPC .................................. *H04L 43/045* (2013.01)
    USPC ........................... 715/764; 715/772; 715/202

(58) Field of Classification Search
    USPC .......................................... 715/764, 772, 202
    See application file for complete search history.

(56) References Cited

U.S. PATENT DOCUMENTS

| | | | |
|---|---|---|---|
| 6,202,199 B1 | 3/2001 | Wygodny et al. | |
| 6,557,167 B1 | 4/2003 | Thelen | |
| 6,944,797 B1 | 9/2005 | Guthrie et al. | |
| 7,043,718 B1 | 5/2006 | Au et al. | |
| 7,386,839 B1 | 6/2008 | Golender et al. | |
| 7,941,789 B2 | 5/2011 | Ivanov et al. | |
| 2004/0027376 A1* | 2/2004 | Calder et al. | 345/755 |
| 2010/0332473 A1 | 12/2010 | Brodsky et al. | |

OTHER PUBLICATIONS

"How to Open Resource Monitor in Windows 7 and Windows 8" by Brink(hereinafter Brink) Published Jun. 8, 2009 available at http://www.sevenforums.com/tutorials/12523-resource-monitor.html.*
Agarwala, et al., "SysProf: Online Distributed Behavior Diagnosis through Fine-grain System Monitoring", Retrieved at <<http://citeseerx.ist.psu.edu/viewdoc/download?doi=10.1.1.111.4801&rep=rep1&type=pdf>>, 26th IEEE International Conference on Distributed Computing Systems (ICDCS), Jul. 4-7, 2006, pp. 8.
Bare, Keith A., "CPU Performance Counter-Based Problem Diagnosis for Software Systems", Retrieved at <<http://www.dtic.mil/cgi-bin/GetTRDoc?AD=ADA507019&Location=U2&doc=GetTRDoc.pdf>>, CMU-CS-09-158, Sep. 2009, pp. 69.

* cited by examiner

*Primary Examiner* — Peiyong Weng
(74) *Attorney, Agent, or Firm* — Andrew Sanders; Micky Minhas; Wolfe-SBMC

(57) ABSTRACT

Performance data for a computing device is displayed in both graphical and tabular portions concurrently. The performance data displayed in the different portions is synchronized, being performance data for the same time range. A user can select a portion of the time range, in response to which the graphical portion displays an indication of the selected portion and the tabular portion displays an indication of which attributes of a performance aspect of the performance data contribute to the performance aspect in the selected portion. A user can also select a particular attribute of a performance aspect in the tabular portion, in response to which the graphical portion displays an indication of the portions of the time range to which the selected attribute contributes to the performance aspect of the performance data.

20 Claims, 10 Drawing Sheets

SYNCHRONIZED GRAPHICAL AND TABULAR PERFORMANCE DATA DISPLAY

BACKGROUND

Situations can arise in which a user of a computing device desires to analyze the performance of the computing device. This analysis allows the user to determine how particular programs are running, how particular resources are being accessed, and so forth. The user can take various actions based on this analysis, such as shutting down programs, modifying programs, and so forth. However, given the complexity of typical computing devices, and the numerous programs that can be running on a computing device at any given time, the amount of information available to a user for analysis can be substantial. Having such a large amount of information available to the user can result in a significant amount of time being taken by the user to analyze the data, which can lead to a cumbersome and frustrating experience for the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request to display performance data for a computing device for a time range is received. In response to the request, a graph including performance data for the computing device for the time range is displayed. The performance data includes one or more attributes of a performance aspect of the computing device. Also in response to the request, a table that includes the performance data for the computing device for the time range is displayed concurrently with the graph.

BRIEF DESCRIPTION OF THE DRAWINGS

The same numbers are used throughout the drawings to reference like features.

DETAILED DESCRIPTION

Synchronized graphical and tabular performance data display is discussed herein. Performance data for a computing device is displayed in both graphical and tabular portions concurrently. The performance data includes data for one or more attributes of a performance aspect (e.g., processor usage, disk usage, etc.) of the computing device, and performance data for multiple performance aspects can be displayed concurrently. The performance data displayed in the graphical and tabular portions is synchronized, with performance data for the same time range being displayed in both the graphical and tabular portions concurrently. A user can select a portion of a time range, in response to which the graphical portion displays an indication of the selected portion and the tabular portion displays an indication of which attributes of the performance aspect contribute to the performance aspect in the selected portion. A user can also select a particular attribute of a performance aspect in the tabular portion, in response to which the tabular portion displays an indication of the selected attribute and the graphical portion displays an indication of the portions of the time range in which the selected attribute contributes to the performance aspect.

Figure 1:
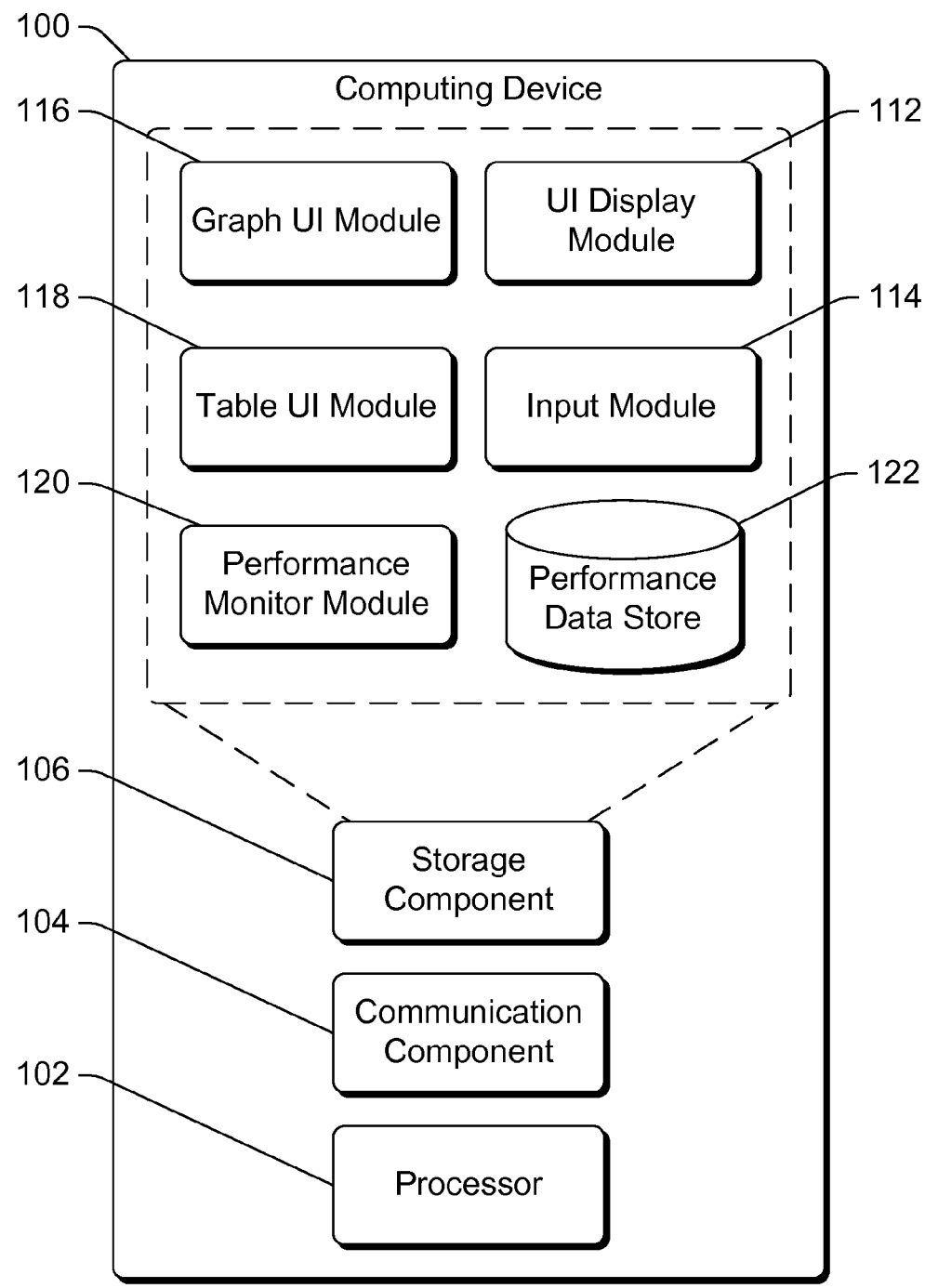
FIG. 1 is a block diagram illustrating an example computing device implementing the synchronized graphical and tabular performance data display in accordance with one or more embodiments.

FIG. 1 is a block diagram illustrating an example computing device 100 implementing the synchronized graphical and tabular performance data display in accordance with one or more embodiments. Computing device 100 can be a variety of different types of devices, such as a physical device or a virtual device. For example, computing device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 100 can also be a virtual device, such as a virtual machine running on a physical device. A virtual machine can be run on any of a variety of different types of physical devices (e.g., any of the various types listed above). Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes a processor 102, a communication component 104, and a storage component 106. Storage component 106 stores instructions that are executed by processor 102, and can be any one or more of a variety of different storage media, such as a magnetic disk, optical disc, Flash memory, random access memory (RAM), and so forth. Processor 102 is also referred to as a central processing unit (CPU) and can have any number of cores, and computing device 100 can include any number of processors. Communication component 104 is an interface allowing computing device 100 to communicate with various other devices in various manners, such as via a wired and/or wireless network (the Internet, a local area network (LAN), a public telephone network, an intranet, other public and/or proprietary networks, combinations thereof, etc.), via other wired and/or wireless connections (e.g., universal serial bus (USB), wireless USB, etc.), and so forth.

Storage component 106 includes a user interface (UI) display module 112, an input module 114, a graph UI module 116, a table UI module 118, a performance monitor module 120, and a performance data store 122. Each module 112-120 can be implemented in software and/or firmware, including instructions which can be executed by processor 102. Alternatively, although illustrated as included in storage component 106, one or more modules 112-120 can be implemented at least in part in hardware. Although specific modules are illustrated in FIG. 1, it should be noted that additional modules can be included in computing device 100. Additionally, it should be noted that the functionality of multiple modules illustrated in FIG. 1 can be combined into a single module, and/or the functionality of one or more modules illustrated in FIG. 1 can be separated into multiple modules.

UI display module 112 generates, manages, and/or outputs a user interface for computing device 100. For example, presentation module 112 manages outputting data for graphs or tables (from modules 116 or 118) for display by a display device. Computing device 100 can include the display device, or alternatively UI display module 112 can transmit signals to a separate display device for display of the data.

A user of computing device 100 can provide various user inputs, such as in response to data displayed by UI display module 112. User inputs can be provided in a variety of different manners, such as by pressing one or more keys of a keypad or keyboard of device 100, pressing one or more keys of a controller (e.g., remote control device, mouse, trackpad, etc.) of device 100, pressing a particular portion of a touchpad or touchscreen of device 100, making a particular gesture on a touchpad or touchscreen of device 100, and/or making a particular gesture on a controller (e.g., remote control device, mouse, trackpad, etc.) of device 100. User inputs can also be provided via other physical feedback input to device 100, such as tapping any portion of device 100, an action that can be recognized by a motion detection component of device 100 (such as shaking device 100, rotating device 100, etc.), and so forth. User inputs can also be provided in other manners, such as via audible inputs to a microphone, via motions of hands or other body parts observed by an image capture device, and so forth. These user inputs allow a user to interact with device 100, such as by inputting particular characters or symbols, selecting particular buttons or menu options, dragging and dropping various descriptions or images, and so forth.

Performance monitor module 120 monitors various performance aspects of computing device 100, collecting and storing performance data in performance data store 122. The performance data generally refers to data describing the manner in which computing device 100 is operating. The performance data can describe the manner in which hardware, software, firmware, and/or combinations thereof of computing device 100 is operating. For example, the performance data can describe the manner in which processor 102 is operating, the manner in which communication component 104 is operating, the manner in which storage component 106 is operating, the manner in which an operating system of computing device 100 is operating, and so forth.

The performance data includes data for one or more attributes of each of one or more performance aspects of computing device 100. A performance aspect of computing device 100 refers to the usage and/or operation of particular hardware, software, firmware, and/or combination thereof of computing device 100. For example, performance aspects of computing device 100 include usage of processor 102, usage of storage component 106, usage of communication component 104, which processes are running on computing device 100, a power source of computing device 100, memory faults generated on computing device 100, which windows displayed by UI display module 112 are in view, and so forth.

Each performance aspect of computing device 100 has one or more associated attributes that describe the usage and/or operation of the performance aspect, and different performance aspects can have different attributes. For example, a processor usage performance aspect may have attributes that are the different processes being run on computing device 100 and how much (e.g., what percentage) of the processor capacity is used by each of the processes. By way of another example, a disk usage performance aspect may have attributes that are the types of operations performed on a disk (e.g., read operations, write operations, flush operations), and the size and/or duration of the operations performed. By way of yet another example, a memory usage performance aspect may have attributes that are the different processes being run on computing device 100 and how much (e.g., how many memory pages or what percentage of) memory is used by each of the processes, how many page faults are generated by each of the processes, and so forth. By way of still another example, a windows displayed performance aspect may have attributes that are the different windows created for the different processes being run on computing device 100 and for each of the windows whether the window is being displayed.

Performance monitor module 120 collects data regarding the performance aspects of computing device 100 at regular or irregular intervals, such as every threshold amount of time (e.g., every microsecond, every nanosecond, etc.), in response to particular events (e.g., a process being created, a process being terminated, etc.), and so forth. The performance data can be collected in any of a variety of conventional manners. Module 120 stores the collected data as performance data in performance data store 122, and includes an indication of the time when the data was collected. The indication can be stored explicitly or inherently in the data structure used to store the performance data. For example, every microsecond data indicating which processes used the processor during the previous microsecond, data indicating how much data was read from and/or written to a storage device during the previous microsecond, data indicating which windows were displayed during the previous microsecond, and so forth can be stored in performance data store 122.

Various operations can also optionally be performed on the performance data by module 120, and the results of those operations can be included as part of the performance data. For example, a calculation to determine a percentage of the processor capacity being used by each of multiple processes can be made by module 120 based on the performance data. Alternatively, such calculations can be performed by other modules (e.g., graph UI module 116 and/or table UI module 118).

The performance data stored in performance data store 122 can be accessed by graph UI module 116 and table UI module 118 to generate graphical or tabular displays of the performance data as discussed in more detail below. Performance data store 122 can be accessed directly by module 116 and/or module 118, or via another module (such as performance monitor module 120).

Graph UI module 116 provides a user interface to display the performance data recorded by performance monitor module 120 graphically via UI display module 112. The user of computing device 100 can provide various inputs to select a type of information displayed in the graph, a time range for which the performance data is displayed, and so forth as discussed in more detail below. Displaying the performance data graphically refers to displaying the performance data using one or more graphs and/or charts. Any of a variety of different types of graphs and/or charts can be used to display the performance data graphically, such as line graphs, stacked line graphs, bar graphs, stacked bar graphs, Gantt charts, and so forth.

Table UI module 118 provides a user interface to display the performance data recorded by performance monitor module 120 tabularly via UI display module 112. The user of computing device 100 can provide various inputs to select a type of information displayed in the table, a time range for which the performance data is displayed, and so forth as discussed in more detail below. Displaying the performance data tabularly refers to displaying the performance data using a table or tabbed format, including one or more columns and one or more rows for the performance data.

Graph UI module 116 displays the performance data graphically concurrently with table UI module 118 displaying the performance data tabularly. The performance data displayed by the modules 116 and 118 is synchronized. The display of the performance data being synchronized refers to the performance data over the same time range being displayed concurrently although in different formats or views (one being graphically and the other being tabularly).

A user of computing device 100 can optionally select which one or more performance aspects of computing device 100 are to be displayed as the performance data graphically and tabularly. A user input selecting a performance aspect can be received in a variety of different manners, such as selection of an icon or thumbnail representing a performance aspect, dragging and dropping an icon or thumbnail representing a performance aspect onto a particular portion of the UI, selection of a menu item identifying a performance aspect from a drop-down or other menu, selection of a tab or button representing a performance aspect, and so forth. In response to such a user input, graph UI module 116 and table UI module 118 display the selected one or more performance aspects as the performance data.

Similarly, a user of computing device 100 can optionally select which one or more attributes of each performance aspect of computing device 100 are to be displayed as the performance data graphically and tabularly. A user input selecting an attribute can be received in a variety of different manners, such as selection of an icon or thumbnail representing an attribute, dragging and dropping an icon or thumbnail representing an attribute onto a particular portion of the UI, selection of a menu item identifying an attribute from a drop-down or other menu, and so forth. In response to such a user input, graph UI module 116 and table UI module 118 display data for the selected one or more attributes of the one or more performance aspects as the performance data.

Additionally, a user of computing device 100 can optionally select a format in which the performance data is displayed graphically and/or tabularly. The format can include, for example, a type of graph to be used in displaying the data, whether performance aspects of computing device 100 are to be displayed as the performance data in columns or row, and so forth. A user input selecting a format can be received in a variety of different manners, such as selection of an icon or thumbnail representing a format, dragging and dropping an icon or thumbnail representing a format onto a particular portion of the UI, selection of a menu item identifying a format from a drop-down or other menu, and so forth. In response to such a user input, graph UI module 116 and table UI module 118 display the performance data using the selected format.

Figure 2:
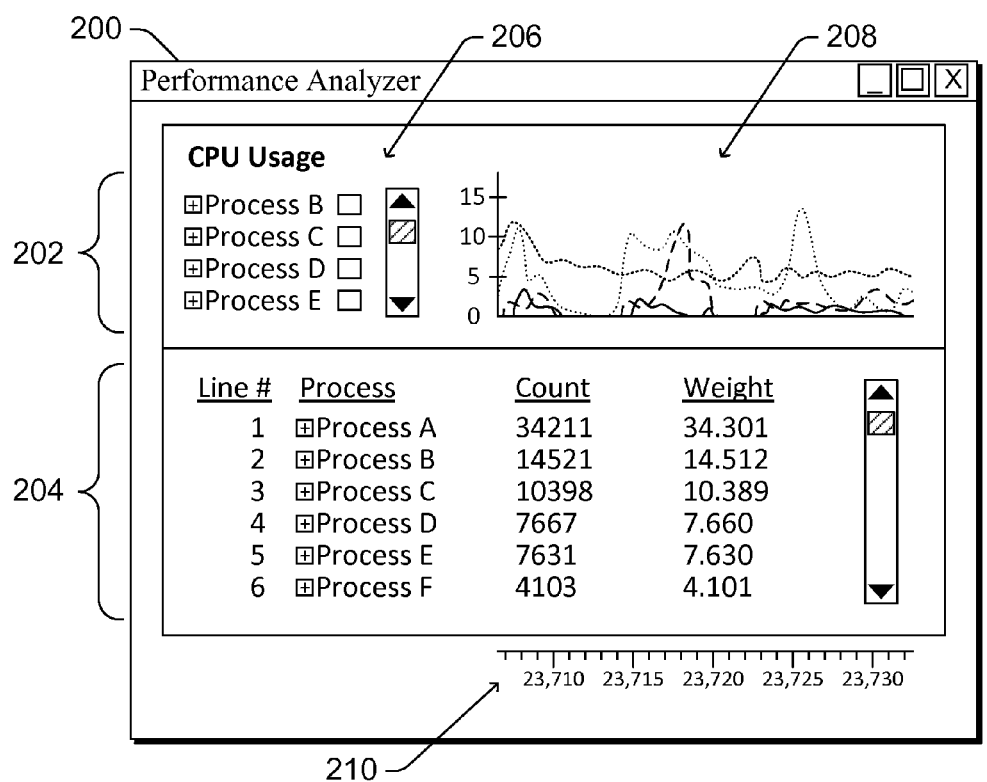
FIG. 2 illustrates an example display of synchronized performance data in accordance with one or more embodiments.

FIG. 2 illustrates an example display 200 of synchronized performance data in accordance with one or more embodiments. Display 200 includes a graphical portion 202 and a tabular portion 204. The performance data displayed in display 200 is for a processor (CPU) usage performance aspect, and has as attributes processes running on a computing device.

Graphical portion 202 includes a legend 206 and a graph 208. Legend 206 identifies the process running on the computing device, such as by process name or other process identifier. Four processes are illustrated (Process B, Process C, Process D, and Process E), although it should be noted that any number of processes can be running on the computing device. A scroll bar is included in legend 206, allowing the user to scroll through the various process identifiers. The process identifiers can be displayed in legend 206 in various orders, such as in order from highest percentage of CPU usage to lowest percentage of CPU usage (or vice versa), alphabetically, and so forth. The user can optionally select the order in which the process identifiers are displayed.

Graph 208 displays graphically the CPU usage of each process on the computing device at multiple times. The CPU usage of a process at a particular time refers to what percentage of the CPU is used by the process at that particular time. The percentage of the CPU can be a percentage of the overall processing capacity of the CPU, or a percentage of the processing capacity of the CPU being used at the particular time. The CPU usage of a process at a particular time is determined based on the collected performance data, as discussed above.

The vertical axis identifies values of CPU usage (e.g., a percentage of the CPU). The scale along the vertical axis of graph 208 can change, varying based on the largest amount of CPU usage of a process. For example, if the largest amount of CPU usage of a process is 15 percent, then the scale along the vertical axis of graph 208 can range from 0 to 15 (or 0 to 20). Alternatively, the scale along the vertical axis of graph 208 can be fixed (e.g., ranging from 0 to 100).

The horizontal axis of graph 208 identifies a time range for the performance data. The time range for the performance data is illustrated as time range 210. Although time range 210 is illustrated as below tabular portion 204, time range 210 can alternatively be illustrated in other locations (e.g., below graph 208 in graphical portion 202). Thus, in the illustrated example, the time range for the performance data is from approximately 23,706.5-23,732.5.

It should be noted that the time range can change, and the user can select any time range that he or she desires. The user can select a time range in various manners, such as entering particular numbers specifying the time range (e.g., 23,705 and 23,730), selecting a time range from another chart or timeline, selecting a time range from a menu, and so forth. In response to selection of a particular time range, the performance data for the appropriate one or more performance aspects of the computing device are displayed. Thus, the user can select any time range he or she desires, in response to which the graphical and tabular portions are changed to display graphically and tabularly performance data for one or more performance aspects for the selected time range.

Each process identified in legend 206 corresponds to a line in graph 208, and this correspondence can be displayed in graphical portion 202. In the illustrated example, graph 208 shows lines with different patterns. Each identified process has a different line pattern (which, although not illustrated in FIG. 2, can be displayed in legend 206 adjacent to or otherwise associated with the corresponding process identifier), allowing the CPU usage of the different processes to be readily identified by the user. Alternatively, the correspondence between process identifiers and graph lines can be displayed in different manners, such as being color-coded (e.g., the process identifier in legend 206 being displayed with the same color as the corresponding line in graph 208), being weight-based (e.g., the process identifier in legend 206 being displayed with characters having the same thickness or weight as the corresponding line in graph 208), combinations thereof, and so forth.

In the illustrated example, four different lines are illustrated in graph portion 208, one for each process identifier displayed in legend 206. However, it should be noted that multiple additional lines can be displayed in graph 208, such as a line for each process on the computing device regardless of whether displayed in legend 206. For example, a computing device may have twenty processes running, although identifiers of only four are displayed in legend 206 at any given time (the others being displayed if the user scrolls through the process identifiers), and lines for all twenty processes can be displayed in graph 208.

It should also be noted that in certain circumstances a line in graph 208 may not be displayed for particular processes. For example, the computing device may have an "idle" process, which refers to the process that is deemed to be using the CPU when no other processes are using the CPU. An identifier of the "idle" process may be displayed in legend 206 (e.g., as Process A) but a line indicating CPU usage by the "idle" process is not displayed in graph 208.

A process can also have multiple sub-processes or threads, and the usage data for those multiple sub-process or threads is combined (e.g., added together) to obtain the usage data for the process that is displayed in graph 208. Identifiers of the sub-processes or threads of a process can also be displayed, such as in response to a user selection. A user selection to have identifiers of the sub-processes or threads displayed can be received in various manners, such as a user input selecting a menu item, user input selecting an icon or symbol, user input selecting a process identifier, and so forth.

In the illustrated example of FIG. 2, an expand box (illustrated as a box with a "+" sign) is associated with and displayed adjacent to each process identifier that includes one or more sub-processes or threads. In response to user selection of an expand box associated with a process identifier, identifiers of the sub-processes or threads of the process identifier are displayed in legend 206. For each sub-process or thread, a line can also optionally be displayed in graph 208 indicating the CPU usage by that sub-process or thread. The lines in graph 208 indicating CPU usage for the sub-processes or threads can be in addition to, or in place of, the line in graph 208 indicating CPU usage for the process. The expand box can also be replaced with a collapse box (e.g., illustrated as a box with a "−" sign). In response to user selection of a collapse box associated with a process identifier, the process identifier remains displayed in legend 206 but the identifiers of the sub-processes or threads of the process identifier are no longer displayed in legend 206 (and lines indicating CPU usage by the sub-processes or threads are also no longer displayed in graph 208).

Additionally, a user can optionally provide an input, via legend 206, to have lines indicating CPU usage by selected ones of the processes identified in legend 206 displayed in graph 208. A user selection to have lines of selected ones of the identified processes displayed can be received in various manners, such as a user input selecting a menu item, user input selecting an icon or symbol, user input selecting a process identifier, and so forth.

In the illustrated example of FIG. 2, a checkbox is associated with (displayed adjacent to) each process identifier. If identifiers of one or more sub-processes or threads of a process are displayed in legend 206, then a checkbox can be displayed adjacent to each sub-process or thread identifier. Multiple ones of the checkboxes can be selected and deselected at various times by the user, allowing the user to select which processes are to have lines displayed in graph 208 at any given time. In response to user selection of a particular checkbox, the line indicating CPU usage for the associated identified process is displayed in graph 208. In response to user de-selection of a particular checkbox, the line indicating CPU usage for the associated identified process is not displayed in graph 208.

Tabular portion 204 displays in a table or tabbed format the CPU usage of each process on the computing device over a time range (e.g., time range 210). Tabular portion 204 displays a table including a line column, a process column, a count column, and a weight column. For each row in the table, the value in the line column indicates the row in the table, the value in the process column is an identifier of a process on the computing device, the value in the count column is a number of samples of data collected during the range of time for which the process was using the CPU, and the value in the weight column is a percentage of the CPU used by the process during the time range. The percentage of the CPU used by the process can be a percentage of the overall processing capacity of the CPU, or a percentage of the processing capacity of the CPU being used at the particular time. For example, the third row of the table indicates a line number of 3, identifies Process C, and indicates that Process C was using the CPU during 10,398 samples in the time range, and that Process C used 10.389% of the CPU during the time range.

The process identifiers can be displayed in tabular portion 204 in various orders, such as in order from highest percentage of CPU usage to lowest percentage of CPU usage (or vice versa), in order from highest count value to lowest count value (or vice versa), alphabetically, and so forth. The user can optionally select the order in which the process identifiers are displayed.

Tabular portion 204 includes a scroll bar, allowing the user to scroll through the various process identifiers in tabular portion 204 analogous to the discussion above regarding legend 206. It should be noted that the computing device can include additional processes not displayed in tabular portion 204, and that the user can use the scroll bar to have identifiers of those additional processes displayed in tabular portion 204.

A process can also have multiple sub-processes or threads, and the usage data for those multiple sub-process or threads is combined (e.g., added together) to obtain the usage data for the process that is displayed in tabular portion 204. Identifiers of the sub-processes or threads of a process can also be displayed, such as in response to a user selection. A user selection to have identifiers of the sub-processes or threads displayed can be received in various manners, such as a user input selecting a menu item, user input selecting an icon or symbol, user input selecting a process identifier, and so forth.

In the illustrated example of FIG. 2, an expand box (illustrated as a box with a "+" sign) is associated with and displayed adjacent to each process identifier that includes one or more sub-processes or threads. In response to user selection of an expand box associated with a process identifier, identifiers of the sub-processes or threads of the process identifier are displayed as rows in tabular portion 204. For each sub-process or thread, the usage data for that sub-process or thread is displayed in tabular portion 204, indicating the count and weight for that sub-process or thread. The usage data in tabular portion 204 indicating CPU usage for the sub-processes or threads can be in addition to, or in place of, the usage data in tabular portion 204 indicating CPU usage for the process. The expand box can also be replaced with a collapse box (e.g., illustrated as a box with a "−" sign). In response to user selection of a collapse box associated with a process identifier, the process identifier remains displayed in tabular portion 204 but the identifiers of the sub-processes or threads of the process identifier are no longer displayed in legend 206 (and values indicating CPU usage by the sub-processes or threads are also no longer displayed in tabular portion 204).

The processes identified in legend 206 and in tabular portion 204 are the same processes. However, as the user can scroll through the identified processes in legend 206 and in tabular portion 204, it is to be appreciated that at any particular time legend 206 and tabular portion 204 may not display the same process identifiers.

The usage data displayed in tabular portion 204 and in graphical portion 202 is the usage data for the same processes over the same time range (e.g., time range 210). The display of the performance data in graphical portion 202 and the display of the performance data in tabular portion 204 are thus synchronized with one another because they both display the same performance data over the same time range. The graphical portion 202 and the tabular portion 204 are also displayed concurrently, as illustrated in FIG. 2. Thus, a user can readily view the same performance data for the computing device over the same time range both graphically and tabularly on the same screen, and need not switch between different views or different screens in order to view the performance data graphically and tabularly.

In one or more embodiments, a user can select one or more portions of the time range to have highlighted in both graphical portion 202 and tabular portion 204. The selection of the one or more portions of the time range can be received as a variety of different user inputs, such as user selection of one or more portions of graph 208 (e.g., dragging a cursor or finger to select one or more portions of graph 208), user selection of one or more portions of time range 210 (e.g., dragging a cursor or finger to select one or more portions of time range 210), user input of particular numbers identifying one or more portions of time range 210 (e.g., the user entering 23,710 and 23,715), user selection of one or more portions of time range 210 from a menu, and so forth.

Figure 3:
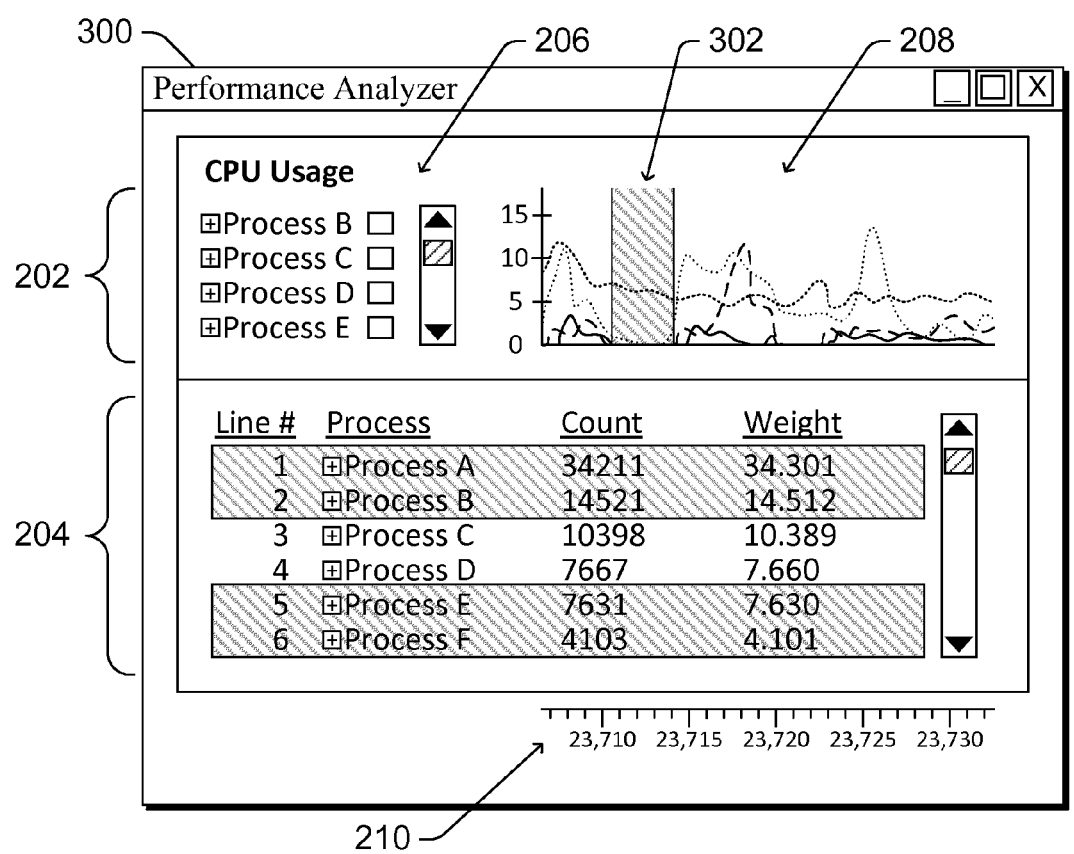
FIG. 3 illustrates an example display of synchronized performance data illustrating selection of a particular portion of a time range in accordance with one or more embodiments.

FIG. 3 illustrates an example display 300 of synchronized performance data illustrating selection of a particular portion of a time range in accordance with one or more embodiments. Display 300 includes a graphical portion 202 and a tabular portion 204, as discussed above with reference to FIG. 2.

In response to user selection of a portion of the time range, the selected portion is identified in graph 208. The selected portion identified in graph 208 is the portion of graph 208 that displays performance data for the times included in the selected portion of the time range. In one or more embodiments, the selected portion 302 is highlighted, illustrated as cross hatching in FIG. 3. Alternatively, the selected portion can be identified in different manners, such as with different intensities (e.g., parts of lines in the selected portion can be displayed with greater intensity or brightness than parts of lines not in the selected portion), arrows or other indicators can be displayed along the horizontal axis of graph 208, and so forth.

Also in response to user selection of a portion of the time range, the processes that contribute to the performance aspect in the selected portion are identified in tabular portion 204. An attribute of a performance aspect contributes to the performance aspect in the selected portion of the time range if at least some of the value of the performance aspect is due to that attribute. Thus, for example, a process contributes to CPU usage in the selected portion of the time range if the process had at least some CPU usage in the selected portion of the time range. By way of another example, a disk operation (e.g., read, write, or flush) contributes to disk usage in the selected portion of the time range if the disk operation performed at least some data transfers (e.g., reads or writes) in the selected portion of the time range.

In the illustrated example, processes that contribute to CPU usage in the selected portion of the time range are highlighted (illustrated as cross hatching in FIG. 3) in tabular portion 204. Alternatively, processes that contribute to CPU usage in the selected portion can be identified in different manners, such as with different intensities, different fonts or colors, arrows or other indicators (e.g., in an additional column adjacent to the line number column), and so forth.

Thus, in the illustrated example, Process A, Process B, Process E, and Process F contribute to CPU usage in the selected portion of the time range. Process C and Process D, however, do not contribute to CPU usage in the selected portion of the time range.

Thus, a user can select a portion of the time range, and have that portion readily identified in graphical portion 202. Additionally, as the processes that contribute to CPU usage in the selected portion are highlighted in tabular portion 204, the user can readily see in tabular portion 204 which processes contribute to CPU usage in the selected portion.

Additionally, although not illustrated in FIG. 3, in one or more embodiments in response to user selection of a portion of the time range, the selected portion is identified in time range 210. The selected portion can be identified in time range 210 in different manners, such as highlighting, analogous to identification of the selected portion in graph 208 as discussed above.

In one or more embodiments, the values displayed in tabular portion 204 and graphed in graphical portion 202 remain those for the time range regardless of which portion of the time range is selected. Alternatively, in response to user selection of a portion of the time range, the values displayed in tabular portion 204 and graphed in graphical portion 202 can be changed to be the values (e.g., percentage of CPU usage) during just the selected portion of the time range rather than during the full time range. The values displayed in tabular portion 204 and graphed in graphical portion 202 would revert to those for the full time range in response to a portion of the time range no longer being selected.

Figure 4:
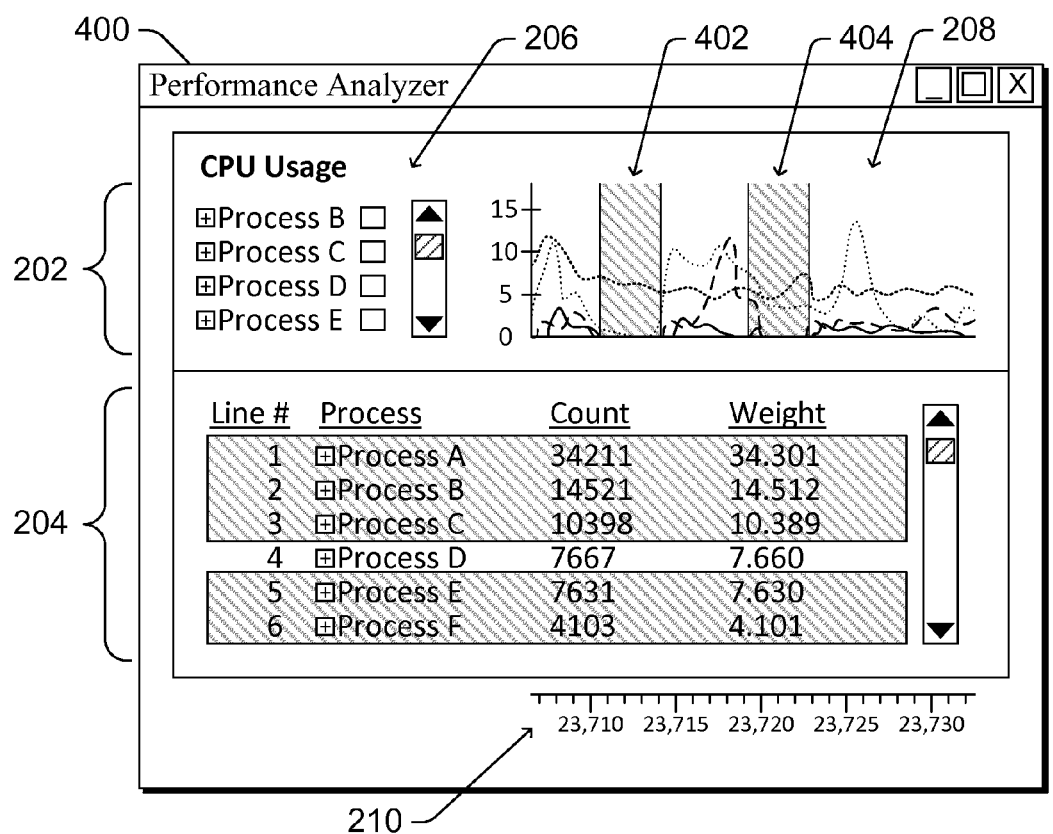
FIG. 4 illustrates an example display of synchronized performance data illustrating selection of multiple portions of a time range in accordance with one or more embodiments.

FIG. 4 illustrates an example display 400 of synchronized performance data illustrating selection of multiple portions of a time range in accordance with one or more embodiments. Display 400 includes a graphical portion 202 and a tabular portion 204, as discussed above with reference to FIG. 2.

Display 400 is similar to display 300 of FIG. 3, however in display 400 two portions of the time range have been selected. In response to user selection of the two portions of the time range, the selected portions are identified in graph 208. In one or more embodiments, the selected portions 402 and 404 are highlighted, illustrated as cross hatching in FIG. 4, although the selected portions can alternatively be identified in other manners as discussed above.

Also in response to user selection of the two portions of the time range, the processes that contribute to the performance aspect in at least one of the selected portions are identified in tabular portion 204. In the illustrated example, processes that contribute to CPU usage in at least one of the selected portions of the time range (processes that had at least some CPU usage in at least one of the selected portions of the time range) are highlighted (illustrated as cross hatching in FIG. 4), although the processes that contribute to CPU usage in at least one of the selected portions can alternatively be identified in other manners as discussed above. Thus, in the illustrated example, Process A, Process B, Process C, Process E, and Process F contribute to CPU usage in at least one of the selected portions of the time range. Process C, however, does not contribute to CPU usage in either of the selected portions of the time range.

Returning to FIG. 2, in one or more embodiments a user can select one or more rows in tabular portion 204. The selection of the one or more rows of tabular portion 204 can be received as a variety of different user inputs, such as user selection of a process identifier or line number in a row of tabular portion 204, user input of a particular process identifier or line number (e.g., the user entering "Process D" or "4"), user selection of one or more rows of tabular portion 204 from a menu, and so forth. In response to user selection of a row in tabular portion 204, one or more portions of the time range in which the attribute identified in the selected row contributes to the performance aspect are identified in graphical portion 202. This identification is in addition to the line in graphical portion 202 corresponding to the attribute identified in the selected row. These one or more portions of the time range can be identified in various manners.

Figure 5:
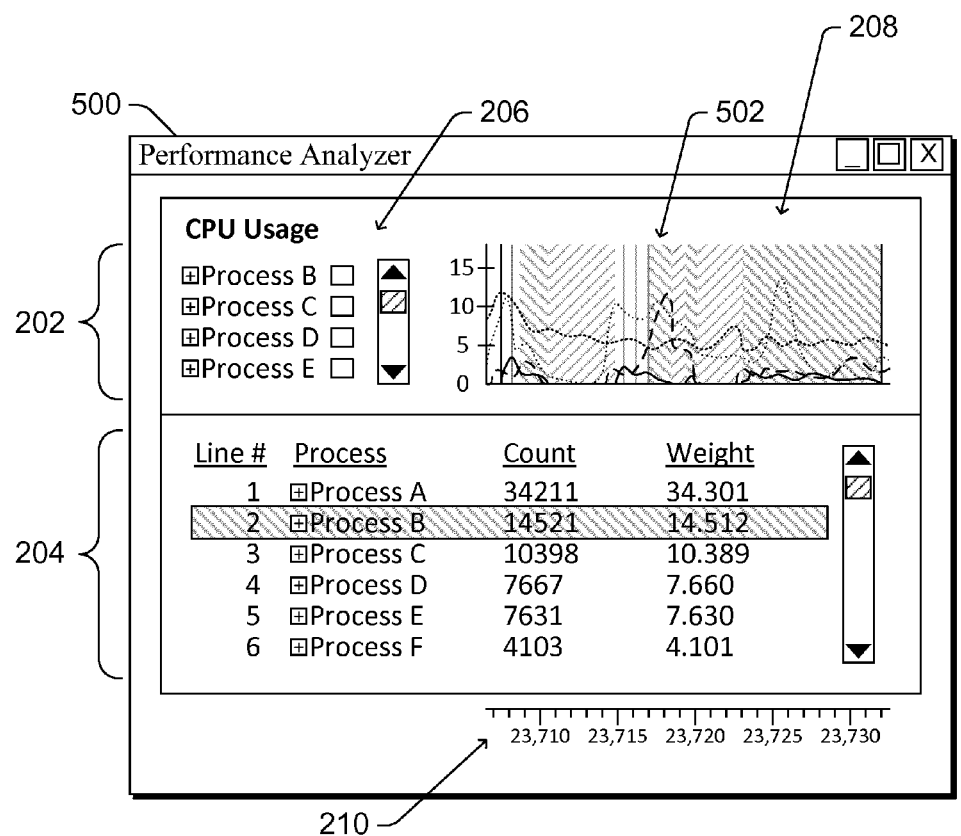
FIG. 5 illustrates an example display of synchronized performance data illustrating selection of a particular row in a tabular portion in accordance with one or more embodiments.

FIG. 5 illustrates an example display 500 of synchronized performance data illustrating selection of a particular row in a tabular portion in accordance with one or more embodiments. Display 500 includes a graphical portion 202 and a tabular portion 204, as discussed above with reference to FIG. 2.

In response to user selection of a row in tabular portion 204, the selected row is identified in tabular portion 204. In one or more embodiments, the selected row is identified by being highlighted, illustrated as cross hatching in FIG. 5. Alternatively, the selected row can be identified in different manners, such as with a different intensity, a different font or color, an arrow or other indicator (e.g., in an additional column adjacent to the line number column), and so forth.

Also in response to user selection of a row in tabular portion 204, a portion of the time range in graphical portion 202 is identified. This portion of the time range in graphical portion 202 spans from the time when the process identified in the selected row initially contributes to the CPU usage (for the time range) to the time when the process identified in the selected row last contributes to the CPU usage (for the time range). Within the identified portion of the time range in graphical portion 202, a gradient identification technique is used to identify contribution to the CPU usage by the process identified in the selected row. It should be noted that the process identified in the selected row need not contribute to the CPU usage for all times within the identified portion (the contribution to the CPU usage for some times within the identified portion can be zero percent).

In one or more embodiments, the portion of the time range is highlighted, illustrated as cross hatching in FIG. 5. The gradient identification technique increases the intensity or brightness of the highlighting based on the contribution to the CPU usage by the process identified in the selected row, with higher contributions to the CPU usage being identified with more intense or brighter highlighting than lower contributions to the CPU usage. The intensity or brightness can change linearly (for example, the difference in intensity or brightness between a contribution of 5% to the CPU usage and a contribution of 10% to the CPU usage can be the same as the difference in intensity or brightness between a contribution of 25% to the CPU usage and a contribution of 30% to the CPU usage). The intensity or brightness can alternatively change nonlinearly (for example, the difference in intensity or brightness between a contribution of 5% to the CPU usage and a contribution of 10% to the CPU usage can be less than the difference in intensity or brightness between a contribution of 25% to the CPU usage and a contribution of 30% to the CPU usage). Alternatively, rather than using different intensity or brightness, the gradient identification technique can use different colors or other mechanisms to identify the contribution to the CPU usage.

Alternatively, rather than using highlighting, portions of the time range in which the process identified in the selected row contributes to the CPU usage can be identified in different manners. For example, one or more lines in the graphical portion can be displayed with different intensities or colors based on the contribution to CPU usage, arrows or other indicators can be displayed along the horizontal axis of graph 208 (with varying arrow shapes or other indicators to identify the contribution to the CPU usage), and so forth.

In the illustrated example, the row including the identifier of "Process B" is selected in tabular portion 204. In response, the row including the identifier of "Process B" is highlighted. Additionally, the portion of the time range that spans from the time when the process identified in the selected row initially contributes to the CPU usage (for the time range) to the time when the process identified in the selected row last contributes to the CPU usage (for the time range) is illustrated as portion 502. The process identified in the selected row contributes to the CPU usage different amounts at different times in portion 502, and different parts of portion 502 are illustrated with different patterns to indicated this different contribution. For example, vertical lines illustrate parts of portion 502 in which the process identified in the selected row contributes to the CPU usage by at least a threshold amount (e.g., 2%), cross hatch lines angling up from left to right illustrate parts of portion 502 in which the process identified in the selected row does not contribute to the CPU usage, and cross hatch lines angling down from left to right illustrate parts of portion 502 in which the process identified by the selected row contributes to the CPU usage by less than the threshold amount (e.g., 2%). Although only three different patterns are illustrated in FIG. 5, it should be noted that any number of different patterns (or intensities, colors, etc.) can be used based on any number of different threshold amounts.

Thus, a user can select a particular process identified in a row of tabular portion 204, and have both the selected row in tabular portion 204 and the portion of the time range from when the process identified in the selected row initially contributes to the CPU usage (for the time range) to the time when the process identified in the selected row last contributes to the CPU usage (for the time range) readily identified in graphical portion 202. These portions can further be displayed in particular manners using a gradient identification technique allowing a contribution to the CPU usage by the process identified in the selected row to be readily identified (e.g., based on differences in intensity or brightness). The user can thus easily see, from the graphical view, an amount that the process identified in the selected row contributes to the CPU usage at different parts of the time range.

Additionally, although not illustrated in FIG. 5, in one or more embodiments in response to user selection of a row of tabular portion 204, the portion of the time range from when the process identified in the selected row initially contributes to the CPU usage (for the time range) to the time when the process identified in the selected row last contributes to the CPU usage (for the time range) are identified in time range 210. This portion of the time range in which the process identified in the selected row contributes to the CPU usage can be identified in time range 210 in different manners, such as highlighting, analogous to identification of the portions in graph 208 as discussed above. Within the identified portion of time range 210, a gradient identification technique can also be used to identify contribution to the CPU usage by the process identified in the selected row, analogous to the use of a gradient identification technique in graph 208 as discussed above.

In one or more embodiments, in response to user selection of one or more rows in tabular portion 204, lines for other processes on the computing device continue to be displayed in graph 208. Alternatively, in response to user selection of one or more rows in tabular portion 204, only the lines indicating CPU usage for the processes identified in the selected one or more rows are displayed in graph 208. Accordingly, user selection of one or more rows in tabular portion 204 can be treated as the user having selected a checkbox in legend 206 associated with the process identified in each of the selected one or more rows.

Figure 6:
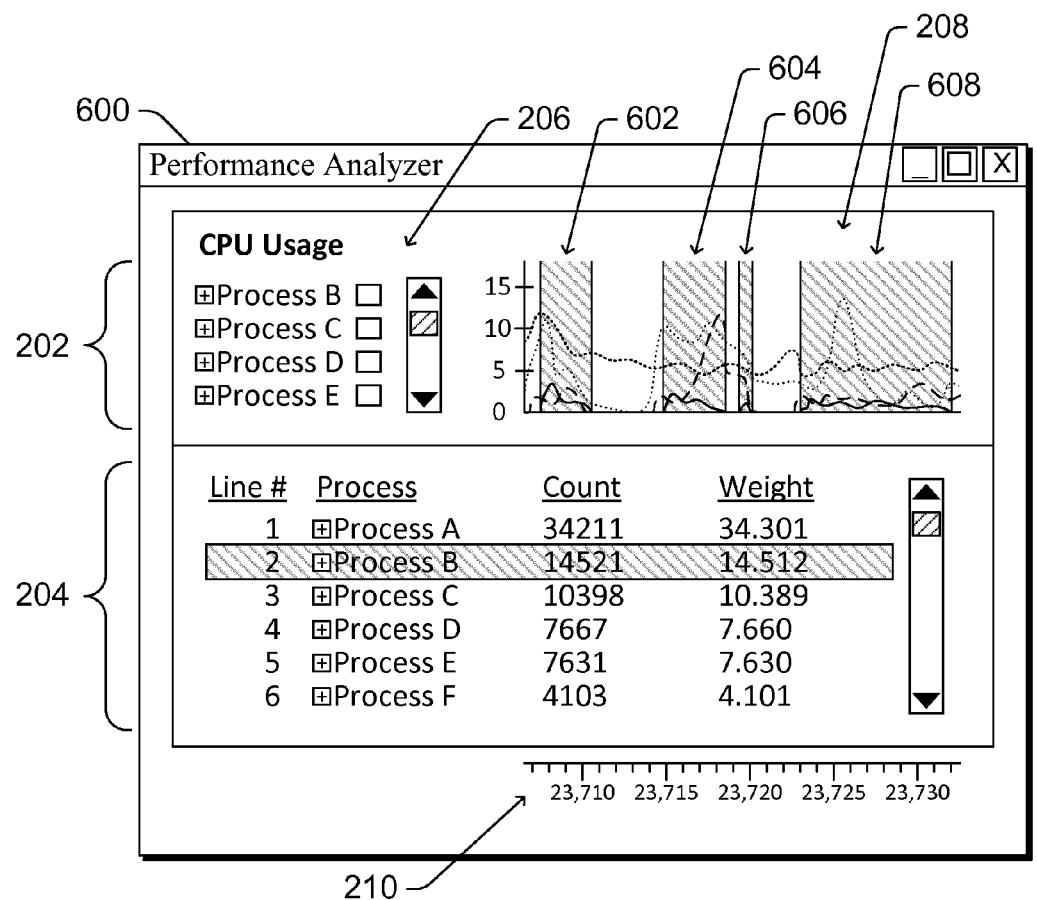
FIG. 6 illustrates another example display of synchronized performance data illustrating selection of a particular row in a tabular portion in accordance with one or more embodiments.

FIG. 6 illustrates another example display 600 of synchronized performance data illustrating selection of a particular row in a tabular portion in accordance with one or more embodiments. Display 600 includes a graphical portion 202 and a tabular portion 204, as discussed above with reference to FIG. 2.

Display 600 is similar to display 500. In response to user selection of a row in tabular portion 204, the selected row is identified in tabular portion 204. The selected row can be identified in different manners, analogous to the discussion above regarding FIG. 5.

Also in response to user selection of a row in tabular portion 204, the portions of the time range in which the process identified in the selected row contributes to the CPU usage are identified in graphical portion 202. In one or more embodiments, the portions of the time range in which the process identified in the selected row contributes to the CPU usage are highlighted, illustrated as cross hatching in FIG. 6. Alternatively, portions of the time range in which the process identified in the selected row contributes to the CPU usage can be identified in different manners, such as with different intensities (e.g., parts of lines in the selected portion can be displayed with greater intensity or brightness than parts of lines not in the selected portion), arrows or other indicators can be displayed along the horizontal axis of graph 208, and so forth. The identification in display 600 can be treated as a special case of the display 500 of FIG. 5, in which the gradient identification technique provides no highlighting or no color for parts of the time range in which the process identified in the selected row does not contribute to the CPU usage.

In the illustrated example, the row including the identifier of "Process B" is selected in tabular portion 204. In response, the row including the identifier of "Process B" is highlighted. Additionally, the portions of the time range in which Process B contributes to the CPU usage are identified in graphical portion 202, illustrated as portions 602, 604, 606, and 608. Within each portion 602, 604, 606, and 608, a gradient identification technique can also be used to identify contribution to the CPU usage by the process identified in the selected row, analogous to the use of a gradient identification technique discussed above with reference to FIG. 5.

Thus, a user can select a particular process identified in a row of tabular portion 204, and have both the selected row in tabular portion 204 and the time ranges in which the identified process contributes to the CPU usage readily identified in graphical portion 202. The user can thus easily see, from the graphical view, which portions of the time range the process identified in the selected row contributes to the CPU usage.

Additionally, although not illustrated in FIG. 6, in one or more embodiments in response to user selection of a row of tabular portion 204, the portions of the time range in which the process identified in the selected row contributes to the CPU usage are identified in time range 210, analogous to the discussion above regarding FIG. 5. Additionally, in response to user selection of one or more rows in tabular portion 204, lines for other processes on the computing device can continue to be displayed in graph 208, or only the lines indicating CPU usage for the processes identified in the selected one or more rows can be displayed in graph 208, analogous to the discussion above regarding FIG. 5.

FIGS. 2-6 illustrate example displays for a processor (CPU) usage performance aspect, including both a graphical portion and a tabular portion for the CPU usage performance aspect. However, it should be noted that, graphical portions and tabular portions can be displayed concurrently for any of various different performance aspects. Furthermore, it should be noted that graphical portions and tabular portions for any number of different performance aspects of the computing device can be displayed concurrently.

Figure 7:
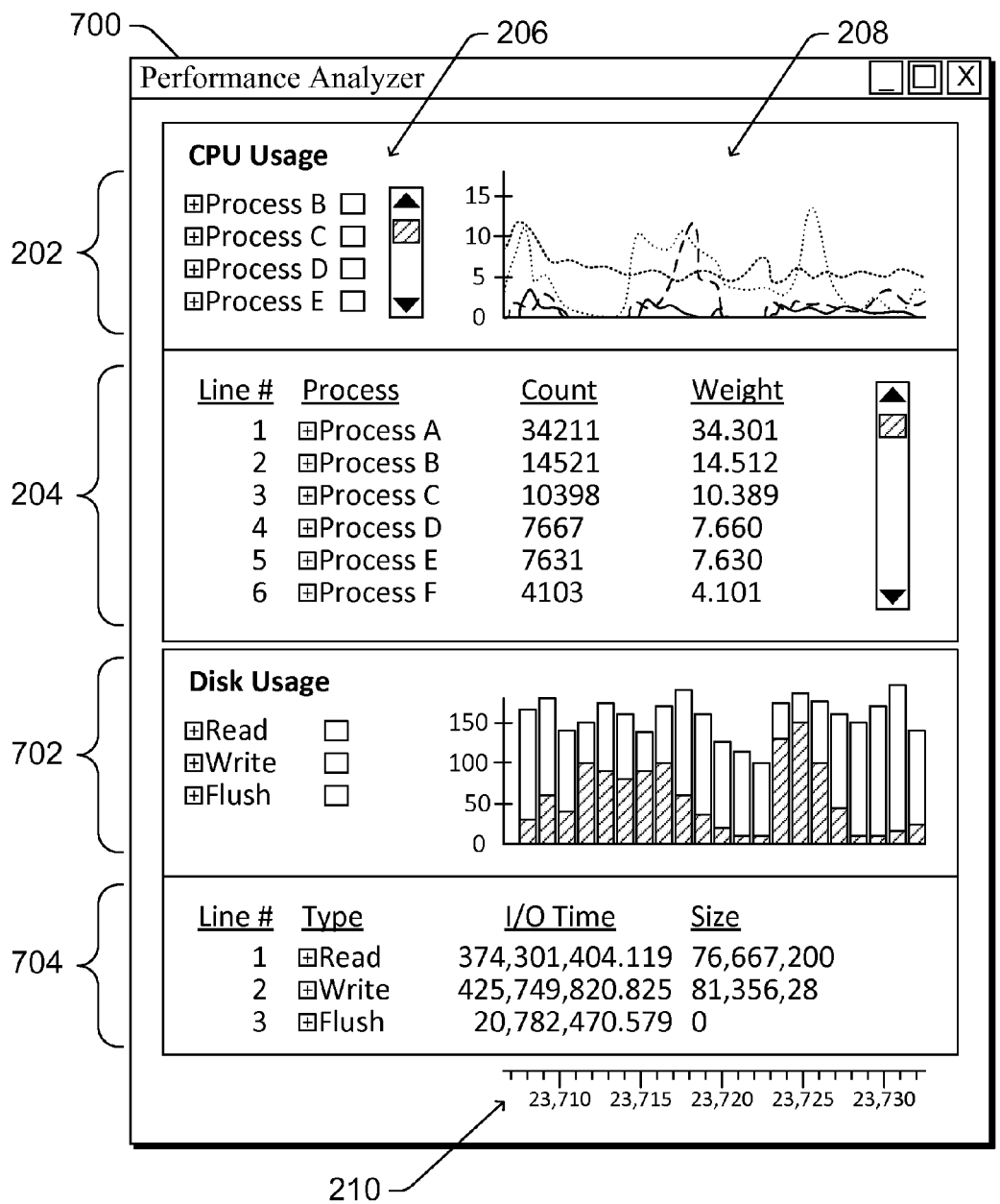
FIG. 7 illustrates an example display of synchronized performance data for multiple performance aspects of a computing device in accordance with one or more embodiments.

FIG. 7 illustrates an example display 700 of synchronized performance data for multiple performance aspects of a computing device in accordance with one or more embodiments. Display 700 includes a graphical portion 202 and a tabular portion 204 for a processor (CPU) usage performance aspect, analogous to the discussion above regarding FIG. 2. Display 700 also includes a graphical portion 702 and a tabular portion 704. The performance data displayed in display 700 is for a disk usage performance aspect, and has as attributes read, write, and flush operations performed on a storage device (a disk).

Graphical portion 702 displays disk usage data for different disk operations graphically, and includes a legend and a graph, analogous to graphical portion 202. However, graphical portion 702 displays identifiers of different disk operations (read, write, and flush) in the legend, and a stacked bar graph rather than a line graph as the graph. The disk operation identifiers can be displayed in various orders, such as in order from largest amount of data transferred to smallest amount of data transferred (or vice versa), in order from most amount of time spent transferring data to least amount of time spent transferring data (or vice versa), alphabetically, and so forth. A scroll bar can be included in the legend, although is not illustrated in FIG. 7.

Each disk operation identified in the legend of graphical portion 702 can correspond to a portion of one or more stacked bars in the graph of graphical portion 702, and this correspondence can be displayed in graphical portion 702. In the illustrated example, the graph in graphical portion 702 shows bars with different patterns to identify the different disk operations (e.g., bars with cross hatching to identify the Read operation and solid bars to identify the Write operation), although the correspondence can be identified in other manners (e.g., the bars in the graph and the identifiers in the legend being color coded, so that for a particular identifier in the legend the bars in the graph have the same color as the identifier).

The graph in graphical portion 202 displays graphically the disk usage by each of the different disk operations for multiple time slices (e.g., sub-ranges of time range 210). The disk usage by an operation at a particular time slice can refer to the amount of data transferred by the operation during that time slice and/or an amount of time the disk operation spent transferring data during that time slice, which can be calculated from the collected performance data discussed above. A user can also optionally provide an input, via the legend of graphical portion 702, to have bars indicating disk usage by selected ones of the different disk operations displayed in the graph of graphical portion 702. A user selection to have bars of selected ones of the different disk operations displayed can be received in various manners analogous to the discussion of legend 206 above, such as a user input selecting a checkbox adjacent to the identifier of the disk operation in the legend, user input selecting a menu item, user input selecting an icon or symbol, user input selecting a process identifier, and so forth.

The vertical axis identifies values of disk usage (e.g., a number of bytes transferred). The scale along the vertical axis of the graph in graphical portion 702 can vary based on the largest amount of data transferred during time range 210, or alternatively can be fixed analogous to the discussion of graph 208 above. The horizontal axis of the graph in graphical portion 702 identifies a time range for the performance data, which is illustrated as time range 210.

Disk operations can also have multiple priority levels. Identifiers of the different priority levels can also be displayed, e.g., by user selection of an expand box displayed adjacent to the disk operation in the legend, analogous to the discussion above regarding sub-processes and threads of processes identified in legend 206.

Tabular portion 704 displays the disk usage data for different disk operations in a table or tabbed format over a time range (e.g., time range 210). Tabular portion 704 displays a table including a line column, a type column, an input/output (I/O) time column, and a size column. For each row in the table, the value in the line column indicates the row in the table, the value in the type column is an identifier of a disk operation on the computing device, the value in the I/O time column is an amount of time (e.g., in microseconds or nanoseconds) during the range of time for which the disk operation was being performed, and the value in the size column is an amount of data (e.g., in bytes) transferred for each disk operation during the time range. For example, the second row of the table indicates a line number of 2, identifies a Write disk operation, and indicates that the Write disk operation was writing data to the disk for 425,749,820.825 microseconds or nanoseconds during the time range, and that the Write disk operation wrote 81,356.28 bytes during the time range.

The disk operation identifiers in tabular portion 704 can be displayed in various orders, such as in order from largest amount of data transferred to smallest amount of data transferred (or vice versa), in order from most amount of time spent transferring data to least amount of time spent transferring data (or vice versa), alphabetically, and so forth. A scroll bar can be included in tabular portion 704, although is not illustrated in FIG. 7.

Disk operations can also have multiple priority levels. Identifiers of the different priority levels can also be displayed, e.g., by user selection of an expand box displayed adjacent to the disk operation in tabular portion 704, analogous to the discussion above regarding sub-processes and threads of processes identified in tabular portion 204.

The disk operations identified in the legend of graphical portion 702 and in tabular portion 704 are the same disk operations. The usage data displayed in tabular portion 704 and in graphical portion 702 is the usage data for the same disk operations over the same time range (e.g., time range 210). The display of the performance data in graphical portion 702 and the display of the performance data in tabular portion 704 are thus synchronized with one another because they both display the same performance data over the same time range. The graphical portion 702 and the tabular portion 704 are also displayed concurrently, as illustrated in FIG. 7. Thus, a user can readily view the same performance data for the computing device over the same time range both graphically and tabularly on the same screen, and need not switch between different views or different screens in order to view the performance data graphically and tabularly.

Furthermore, the usage data displayed in tabular portion 704 and graphical portion 702 is the usage data over the same time range (e.g., time range 210) as the usage data displayed in tabular portion 204 and graphical portion 202. The display of the performance data in tabular portion 704, graphical portion 702, tabular portion 204, and graphical portion 202 are thus synchronized with one another because they all display performance data over the same time range. Thus, not only can a user readily view the same performance data for the same performance aspect of the computing device both graphically and tabularly on the same screen, the user can also readily view the performance data for multiple performance aspects of the computing device both graphically and tabularly on the same screen.

In one or more embodiments, a user can select one or more portions of the time range to have highlighted in graphical portion 202, tabular portion 204, graphical portion 702, and tabular portion 704. The selection of the one or more portions of the time range can be received as a variety of different user inputs, such as user selection of one or more portions of a graph in graphical portion 202 or graphical portion 702 (e.g., dragging a cursor or finger to select one or more portions of a graph), user selection of one or more portions of time range 210 (e.g., dragging a cursor or finger to select one or more portions of time range 210), user input of particular numbers identifying one or more portions of time range 210 (e.g., the user entering 23,710 and 23,715), user selection of one or more portions of time range 210 from a menu, and so forth.

Figure 8:
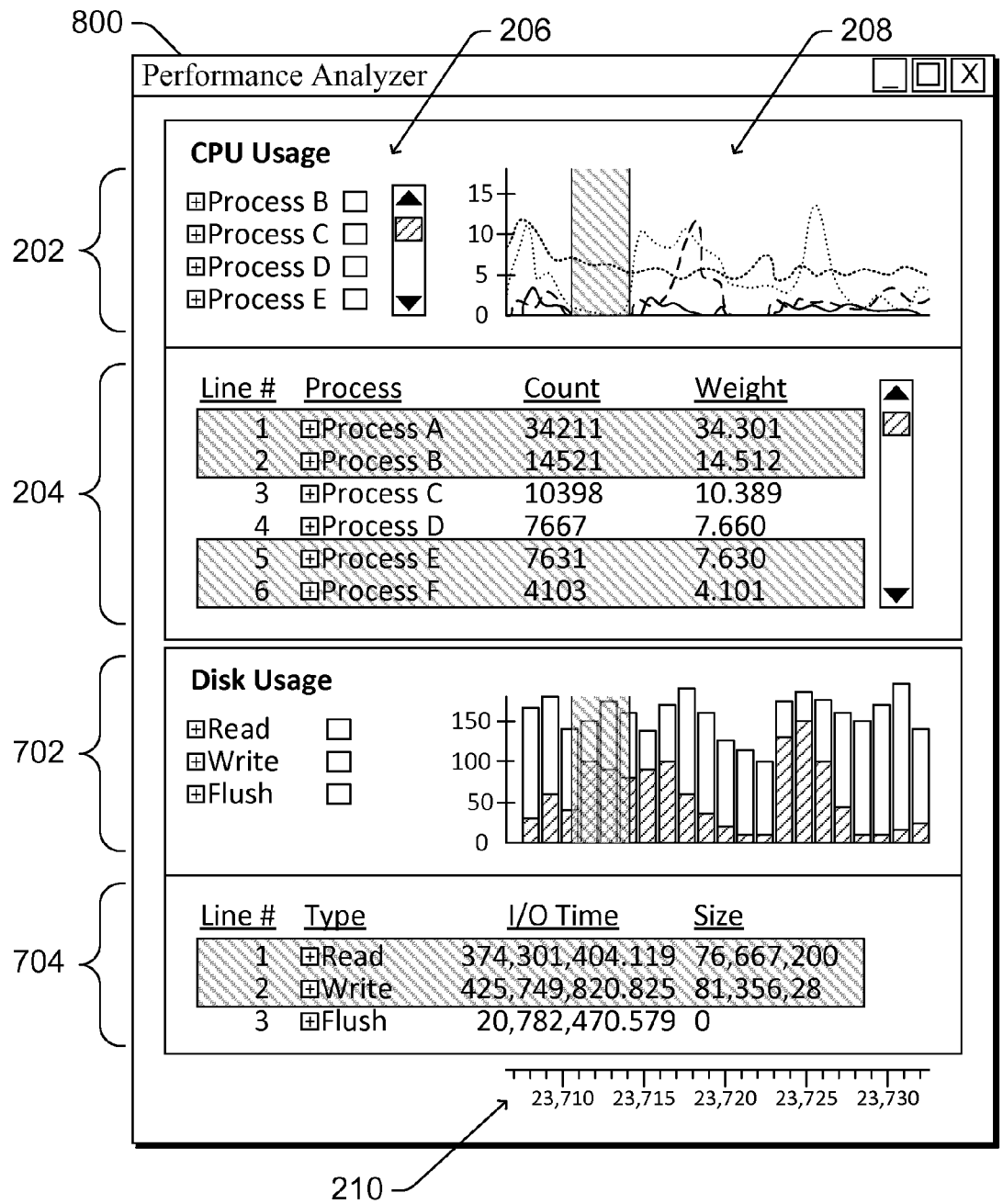
FIG. 8 illustrates an example display of synchronized performance data illustrating selection of a particular portion of a time range in accordance with one or more embodiments.

FIG. 8 illustrates an example display 800 of synchronized performance data illustrating selection of a particular portion of a time range in accordance with one or more embodiments. Display 800 includes a graphical portion 202, a tabular portion 204, a graphical portion 702, and a graphical portion 704 as discussed above with reference to FIG. 7.

In response to user selection of a portion of the time range, the selected portion is identified in the graph of graphical portion 202 as well as the graph of graphical portion 702. The selected portion is highlighted, illustrated as cross hatching in FIG. 8, although the selected portion can alternatively be identified in different manners analogous to the discussions above. The portion of the time range can be selected in various manners as discussed above.

Also in response to user selection of a portion of the time range, the processes that contribute to the CPU usage performance aspect in the selected portion are identified in tabular portion 204, and the disk operations that contribute to the disk usage performance aspect in the selected portion are identified in tabular portion 704. In the illustrated example, processes that contribute to CPU usage in the selected portion of the time range (processes that had at least some CPU usage in the selected portion of the time range) are highlighted (illustrated as cross hatching in FIG. 8), although the processes that contribute to CPU usage in the selected portion can be identified in different manners analogous to the discussion above. Disk operations that contribute to disk usage in the selected portion of the time range (disk operations that were performed at least some in the selected portion of the time range) are highlighted (illustrated as cross hatching in FIG. 8), although the processes that contribute to CPU usage in the selected portion can be identified in different manners analogous to the discussion above.

Thus, in the illustrated example, Process A, Process B, Process E, and Process F contribute to CPU usage in the selected portion of the time range. Process C and Process D, however, do not contribute to CPU usage in the selected portion of the time range. Furthermore, the Read disk operation and Write disk operation contribute to disk usage in the selected portion of the time range. The Flush disk operation, however, does not contribute to disk usage in the selected portion of the time range.

Thus, a user can select a portion of the time range, and have that portion readily identified in graphical portion 202 as well as graphical portion 702. Additionally, as the processes that contribute to CPU usage in the selected portion are highlighted in tabular portion 204, and the disk operations that contribute to the disk usage in the selected portion are highlighted in tabular portion 704, the user can readily see in tabular portion 204 which processes contribute to CPU usage in the selected portion and which disk operations contribute to disk usage in the selected portion.

Additionally, although not illustrated in FIG. 8, in one or more embodiments in response to user selection of a portion of the time range, the selected portion is identified in time range 210. The selected portion in can be identified in time range 210 in different manners, such as highlighting, analogous to identification of the selected portion in graph 208 as discussed above.

Furthermore, although not illustrated in FIG. 8, in one or more embodiments a user can select a row in tabular portion 204 and/or tabular portion 704. Analogous to the discussions above, in response to user selection of a row in tabular portion 204, one or more portions of the time range in which the attribute identified in the selected row contributes to the performance aspect are identified in graphical portion 202. And, in response to user selection of a row in tabular portion 704, one or more portions of the time range in which the attribute identified in the selected row contributes to the performance aspect are identified in graphical portion 702.

FIGS. 2-8 illustrate example displays for displaying performance data. However, it should be noted that these displays are examples, and that performance data can be displayed in other manners. For example, different types of graphs can be used, rows and columns of tabular views can be switched (data illustrated as being displayed in a row can instead be displayed in a column), graphs and tables can be organized or laid out in different manners, and so forth.

Figure 9:
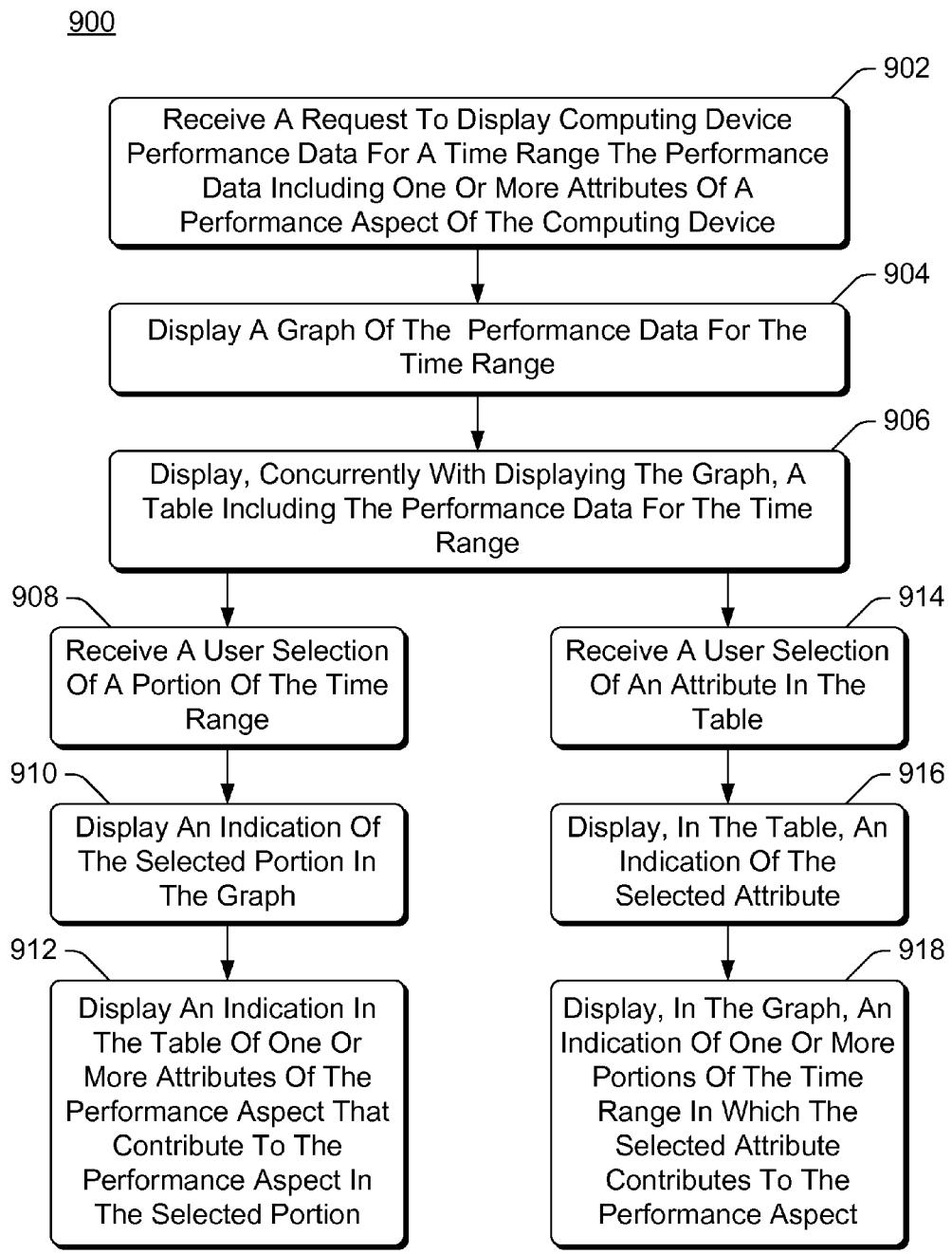
FIG. 9 is a flowchart illustrating an example process for implementing the synchronized graphical and tabular performance data display in accordance with one or more embodiments.

FIG. 9 is a flowchart illustrating an example process 900 for implementing the synchronized graphical and tabular performance data display in accordance with one or more embodiments. Process 900 is carried out by a device, such as computing device 100 of FIG. 1, and can be implemented in software, firmware, hardware, or combinations thereof. Process 900 is shown as a set of acts and is not limited to the order shown for performing the operations of the various acts. Process 900 is an example process for implementing the synchronized graphical and tabular performance data display; additional discussions of implementing the synchronized graphical and tabular performance data display are included herein with reference to different figures.

In process 900, a request to display computing device performance data for a time range is received (act 902). The performance data includes one or more attributes for a performance aspect of the computing device, as discussed above. The request can be a user request, or alternatively can be a request received from another component or module of the computing device, or alternatively a request received from another computing device.

A graph including the performance data is displayed for the time range (act 904), so the performance data is displayed graphically.

A table including the performance data is also displayed for the time range (act 906), so the performance data is also displayed tabularly. The graph and table are displayed concurrently. Additionally, the performance data is displayed in the graph and the table for the same time range, so that the graphical and tabular displays of the performance data are synchronized.

A user selection of a portion of the time range is also optionally received (act 908). The portion of the time range can be selected in various manners as discussed above.

In response to the user selection of a portion of the time range, an indication of the selected portion is displayed in the graph (act 910). This indication can be, for example, highlighting the portion in the graph that displays performance data for the times included in the selected portion of the time range as discussed above.

Additionally, in response to the user selection of a portion of the time range, an indication of one or more attributes of the performance aspect that contribute to the performance aspect in the selected portion is displayed (act 912). This indication can be, for example, highlighting rows of the table that identify attributes of the performance aspect that contribute to the performance aspect in the selected portion as discussed above.

Returning to act 906, a user selection of an attribute in the table is also optionally received (act 914). The attribute can be selected in various manners as discussed above.

In response to the user selection of the attribute, an indication of the attribute is displayed in the table (act 916). This indication can be, for example, highlighting a row of the table that includes the attribute as discussed above.

Additionally, in response to the user selection of the attribute, an indication of one or more portions of the time range in which the selected attribute contributes to the performance aspect is displayed (act 918). This indication can be, for example, highlighting the one or more portions in the graph as discussed above.

Various actions such as communicating, receiving, recording, storing, generating, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 10:
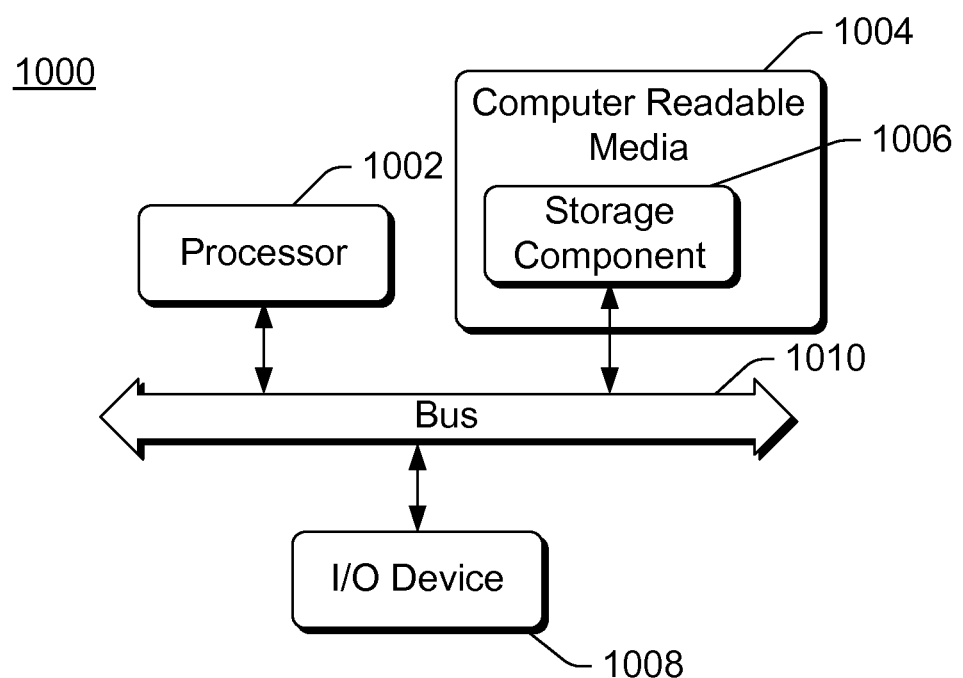
FIG. 10 illustrates an example computing device that can be configured to implement the synchronized graphical and tabular performance data display in accordance with one or more embodiments.

FIG. 10 illustrates an example computing device 1000 that can be configured to implement the synchronized graphical and tabular performance data display in accordance with one or more embodiments. Computing device 1000 can be, for example, computing device 100 of FIG. 1.

Computing device 1000 includes one or more processors or processing units 1002, one or more computer readable media 1004 which can include one or more storage components 1006, one or more input/output (I/O) devices 1008, and a bus 1010 that allows the various components and devices to communicate with one another. Computer readable media 1004 and/or one or more I/O devices 1008 can be included as part of, or alternatively may be coupled to, computing device 1000. Processor 1002, computer readable media 1004, one or more of devices 1008, and/or bus 1010 can optionally be implemented as a single component or chip (e.g., a system on a chip). Bus 1010 represents one or more of several types of bus structures, including a memory bus or memory controller, a peripheral bus, an accelerated graphics port, a processor or local bus, and so forth using a variety of different bus architectures. Bus 1010 can include wired and/or wireless buses.

Storage component 1006 represents one or more computer storage media. Component 1006 can include volatile media (such as random access memory (RAM)) and/or nonvolatile media (such as read only memory (ROM), Flash memory, optical disks, magnetic disks, and so forth). Component 1006 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1002. It is to be appreciated that different instructions can be stored in different components of computing device 1000, such as in a processing unit 1002, in various cache memories of a processing unit 1002, in other cache memories of device 1000 (not shown), on other computer readable media, and so forth. Additionally, it is to be appreciated that the location where instructions are stored in computing device 1000 can change over time.

One or more input/output devices 1008 allow a user to enter commands and information to computing device 1000, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its attributes set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 10. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the synchronized graphical and tabular performance data display techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

receiving a request to display performance data for a computing device for a time range;

displaying concurrently by the computing device, in response to the request, a first graph and a second graph including a first performance data and a second performance data for the computing device for the time range, the first performance data including one or more attributes of a first performance aspect of the computing device displayed in the first graph and the second performance data including one or more attributes of a second performance aspect of the computing device displayed in the second graph;

displaying by the computing device, in response to the request and concurrently with the first graph, a first table including the first performance data for the computing device for the time range;

displaying by the computing device, in response to the request and concurrently with the second graph, a second table including the second performance data for the computing device for the time range;

receiving a user selection of a first portion and a second portion of the time range;

displaying, in the first graph, both an indication of the selected first portion of the time range and an indication of the selected second portion of the time range;

displaying, in the second graph, both an indication of the selected first portion of the time range and an indication of the selected second portion of the time range;

displaying concurrently, in the first table, an indication of which of the one or more attributes of the first performance aspect of the computing device contribute to the first performance aspect in at least one of the selected portions of the time range; and displaying concurrently, in the second table, an indication of which of the one or more attributes of the second performance aspect of the computing device contribute to the second performance aspect in at least one of the selected portions of the time range.

2. A method as recited in claim 1, further comprising receiving a user input selecting the time range.

3. A method as recited in claim 2, further comprising:
receiving, an additional user input selecting an additional time range;
displaying, in response to the additional user input, the first graph and second graph including the first performance data and second performance data for the computing device for the additional time range; and
displaying, in response to the additional user input, the first table and second table including the first performance data and second performance data for the computing device for the additional time range.

4. A method as recited in claim 1, the indication of the selected first portion identifying the selected first portion with one of different intensity of parts of lines, different brightness of parts of lines, or an indicator along an axis of the first graph.

5. A method as recited in claim 4, further comprising:
receiving a user selection of an additional portion of the time range;
displaying, in the first graph, both the indication of the selected first and second portions of the time range and an indication of the additional selected portion of the time range; and
displaying, in an additional table, an indication of which of the one or more attributes of an additional performance aspect of the computing device contribute to the additional performance aspect in at least one of the selected first and second portions of the time range and the additional selected portion of the time range.

6. A method as recited in claim 4, the displaying the indication in the first and second tables comprising highlighting, in the first and second tables, the one␣or more attributes of the first performance aspect and second performance aspect of the computing device that contribute to the first performance aspect and second performance aspect in at least one of the selected first and second portions of the time range.

7. A method as recited in claim 1, further comprising:
displaying, in response to the request and concurrently with the first and second graphs, an additional graph including additional performance data for the computing device for the time range, the additional performance data including one or more attributes of an additional performance aspect of the device; and
displaying, in response to the request and concurrently with the additional graph, an additional table including the additional performance data for the computing device for the time range.

8. A method as recited in claim 7, further comprising:
receiving, an additional user input selecting an additional time range;
displaying, in response to the additional user input:
the first and second graphs including the respective first and second performance data for the computing device for the additional time range;
the first and second tables including the respective first and second performance data for the computing device for the additional time range;
the additional graph including the additional performance data for the computing device for the additional time range; and
the additional table including the additional performance data for the computing device for the additional time range.

9. A method as recited in claim 7, further comprising:
displaying, in the additional graph, an indication of the selected portion of the time range; and
displaying, in the additional table, an indication of which of the one or more attributes of the additional performance aspect of the computing device contribute to the additional performance aspect in at least one of the selected portions of the time range.

10. A method as recited in claim 1, further comprising:
receiving a user selection of one of the one or more attributes included in the first table;
displaying, in the first graph, an indication of a portion of the time range spanning from a time when the one attribute initially contributes to the first performance aspect to a time when the one attribute last contributes to the first performance aspect, the indication identifying different contributions to the first performance aspect by the one attribute using a gradient identification technique; and
displaying, in the first table, an indication of the one attribute.

11. A method as recited in claim 10, the one attribute comprising a process and the first performance aspect comprising processor usage.

12. A method comprising:
receiving a request to display performance data for a computing device for a time range;
receiving a user selection of a first portion of the time range and at least one subsequent selection of an additional portion of the time range;
displaying by the computing device, in response to the request,
a first graph including first performance data for the computing device for the time range, the first performance data including one or more attributes of processor usage of the computing device, portions of the first graph corresponding to the selected portions of the time range being highlighted, and
a second graph including second performance data for the computing device for the time range, the second performance data including one or more attributes of disk usage of the device, portions of the second graph corresponding to the selected portions of the time range being highlighted; and
displaying by the computing device, in response to the request and concurrently with the first graph and the second graph,
a first table including the first performance data for the computing device for the time range, and highlighting in the first table the one or more attributes of the processor usage of the computing device that contribute to the processor usage in the selected portions of the time range, and
a second table including the second performance data for the computing device for the time range, and highlighting in the second table the one or more attributes of the disk usage of the computing device that contribute to the disk usage in the selected portions of the time range.

13. A computing device comprising:
one or more processors implemented at least in part in hardware;
one or more computer storage media having stored thereon multiple instructions that, when executed by the one or more processors, cause the one or more processors to:
receive a request to display performance data for a computing device for a time range;
display concurrently by the computing device, in response to the request, a first graph and a second graph including a first performance data and a second performance data for the computing device for the time range, the first performance data including one or more attributes of a first performance aspect of the computing device displayed in the first graph and the second performance data including one or more attributes of a second performance aspect of the computing device displayed in the second graph;
display by the computing device, in response to the request and concurrently with the first graph, a first table including the first performance data for the computing device for the time range;
display by the computing device, in response to the request and concurrently with the second graph, a second table including the second performance data for the computing device for the time range;
receive a user selection of a first portion and a second portion of the time range;
display, in the first graph, both an indication of the selected first portion of the time range and an indication of the selected second portion of the time range;
display, in the second graph, both an indication of the selected first portion of the time range and an indication of the selected second portion of the time range;
display concurrently, in the first table, an indication of which of the one or more attributes of the first performance aspect of the computing device contribute to the first performance aspect in at least one of the selected portions of the time range; and
display concurrently, in the second table, an indication of which of the one or more attributes of the second performance aspect of the computing device contribute to the second performance aspect in at least one of the selected portions of the time range.

14. A computing device as recited in claim 13, the multiple instructions further causing the one or more processors to receive a user input selecting the time range.

15. A computing device as recited in claim 13, the multiple instructions further causing the one or more processors to:
receive, an additional user input selecting an additional time range;
display, in response to the additional user input, the first graph and second graph including the first performance data and second performance data for the computing device for the additional time range; and
display, in response to the additional user input, the first table and second table including the first performance data and second performance data for the computing device for the additional time range.

16. A computing device as recited in claim 13, wherein the indication of the selected first portion identifies the selected first portion with one of different intensity of parts of lines, different brightness of parts of lines, or an indicator along an axis of the first graph.

17. A computing device as recited in claim 16, wherein to display the indication in the first and second tables comprises highlighting, in the first and second tables, the one or more attributes of the first performance aspect and second performance aspect of the computing device that contribute to the first performance aspect and second performance aspect in at least one of the selected first and second portions of the time range.

18. A computing device as recited in claim 13, the multiple instructions further causing the one or more processors to:
receive a user selection of an additional portion of the time range;
display, in the first graph, both the indication of the selected first and second portions of the time range and an indication of the additional selected portion of the time range; and
display, in an additional table, an indication of which of the one or more attributes of an additional performance aspect of the computing device contribute to the additional performance aspect in at least one of the selected first and second portions of the time range and the additional selected portion of the time range.

19. A computing device as recited in claim 13, the multiple instructions further causing the one or more processors to:
receive a user selection of one of the one or more attributes included in the first table;
display, in the first graph, an indication of a portion of the time range spanning from a time when the one attribute initially contributes to the first performance aspect to a time when the one attribute last contributes to the first performance aspect, the indication identifying different contributions to the first performance aspect by the one attribute using a gradient identification technique; and
display, in the first table, an indication of the one attribute.

20. A computing device as recited in claim 19, wherein the one attribute comprises a process and the first performance aspect comprises processor usage.

* * * * *